(12) United States Patent
Yoshida et al.

(10) Patent No.: US 6,184,999 B1
(45) Date of Patent: *Feb. 6, 2001

(54) IMAGE PROCESSING APPARATUS (75) Inventors: Eiichi Yoshida; Eiichiro Kawasaki, both of Toyokawa; Tomoyuki Atsumi, Toyohashi; Takeshi Morikawa, Okazaki, all of (JP)

(73) Assignee: Minolta Company, Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/795,188

(22) Filed: Feb. 4, 1997

(30) Foreign Application Priority Data

Feb. 5, 1996 (JP) .................................................. 8-018781

(51) Int. Cl.$^7$ .............................. G06K 15/02; H04N 1/21
(52) U.S. Cl. ........................................... 358/1.16; 358/1.6
(58) Field of Search .................................. 358/426, 444, 358/404, 296, 468, 474, 1.15, 1.16, 1.17, 1.6; 395/114; 382/232, 233, 305

(56) References Cited

U.S. PATENT DOCUMENTS

| 5,337,319 | * | 8/1994 | Furukawa et al. | 395/114 |
| 5,465,172 | * | 11/1995 | Fukushima et al. | 358/498 |
| 5,519,499 | * | 5/1996 | Saito | 358/296 |
| 5,619,594 | * | 4/1997 | Melen | 382/233 |
| 5,684,602 | * | 11/1997 | Tsuchiya et al. | 358/404 |
| 5,710,638 | * | 1/1998 | Yamamoto et al. | 382/232 |

FOREIGN PATENT DOCUMENTS 7-32459  4/1995  (JP) .

* cited by examiner

Primary Examiner—Scott Rogers
(74) Attorney, Agent, or Firm—McDermott, Will & Emery (57) ABSTRACT

An image processing apparatus of the present invention provides an image reader which reads image, an image memory which stores image data read by said image reader, a compressor which reads out image data previously stored in said image memory, and compresses image data reading out, and a controller which controls starting operation of said compressor so as not to complete compressing image data in said image memory before completion of storing image data into said image memory.

20 Claims, 12 Drawing Sheets

B1: compression speed of best image compression
B2: compression speed of worst image compression

FIG. 7

A: document reading speed
B1/B1': compression speed of best image compression

FIG. 8

B2: compression speed of worst image compression
A/A': next document reading speed

FIG. 9

A1 : first document reading speed
B1-1: compression speed of best image compression
B2-1: compression speed of worst image compression
A2 : second document reading speed
B1-2: compression speed of best image compression
B2-2: compression speed of worst image compression
A3 : third document reading speed

IMAGE PROCESSING APPARATUS

BACKGROUND OF THE INVENTION

The present invention relates to an image processing apparatus for compressing and processing image data output from an image reading means, and is suitable for use to improve the functionality of digital copying apparatuses, facsimile apparatuses and the like.

In digital copying apparatuses, for example, memory copy mode is known, wherein image data read from a document are temporarily stored in memory, and a copy image is printed based on said stored image data. Thus, a document is read once regardless of the number of copies to be made when making a plurality of copies in memory copy mode. When the document reading speed is slower than the printing speed, therefore, the copying time can be greatly reduced by using the memory copy mode. Electronic sorting is an example of a memory copy mode application. Electronic sorting is a copy mode wherein image data read from a plurality of original documents are stored in memory, and the image data of each document are repeatedly read out from said memory and copies of a plurality of documents are sequentially made one by one. Normally, compressed image data (hereinafter referred to as "compressed data") are stored in memory so as to allow the storage of as many documents as possible.

In conventional copying apparatuses, image data in pixel units obtained by scanning a document are stored in pixel array sequence in an image memory, a compression process starts after waiting for the image data of one page, i.e., image data corresponding to one document page, to be stored. That is, after one page of a document has been read, the process of compressing the obtained image data is started. Scanning of the next document page is accomplished after the compression processing of the previous one page is completed. In other words, after the compression processing of the image data of the read document completes, the reading of the next document begins.

SUMMARY OF THE INVENTION

An object of the present invention is to reduce the time required from the start of reading a document to the completion of the compression process to allow faster image data processing.

The present invention provides in an image processing apparatus comprising an image reader which reads image, an image memory which stores image data read by said image reader, a compressor which reads out image data previously stored in said image memory, and compresses image data reading out, and a controller which controls starting operation of said compressor so as not to complete compressing image data in said image memory before completion of storing image data into said image memory.

Furthermore, the present invention provides in an image processing apparatus comprising an image reader which sequentially reads image data of a first and a second document, an image memory which stores image data read by said image reader, a compressor which reads out image data previously stored by said image memory, and compresses image data reading out, and a controller which controls starting operation of said image reader so as not to complete storing image data of said second document before completion of compressing image data of said first document.

Therefore, the required time from the time reading of a document starts until the compression process completes can be reduced, and the image data processing can be accomplished faster.

These and other objects and features of the present invention will be apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
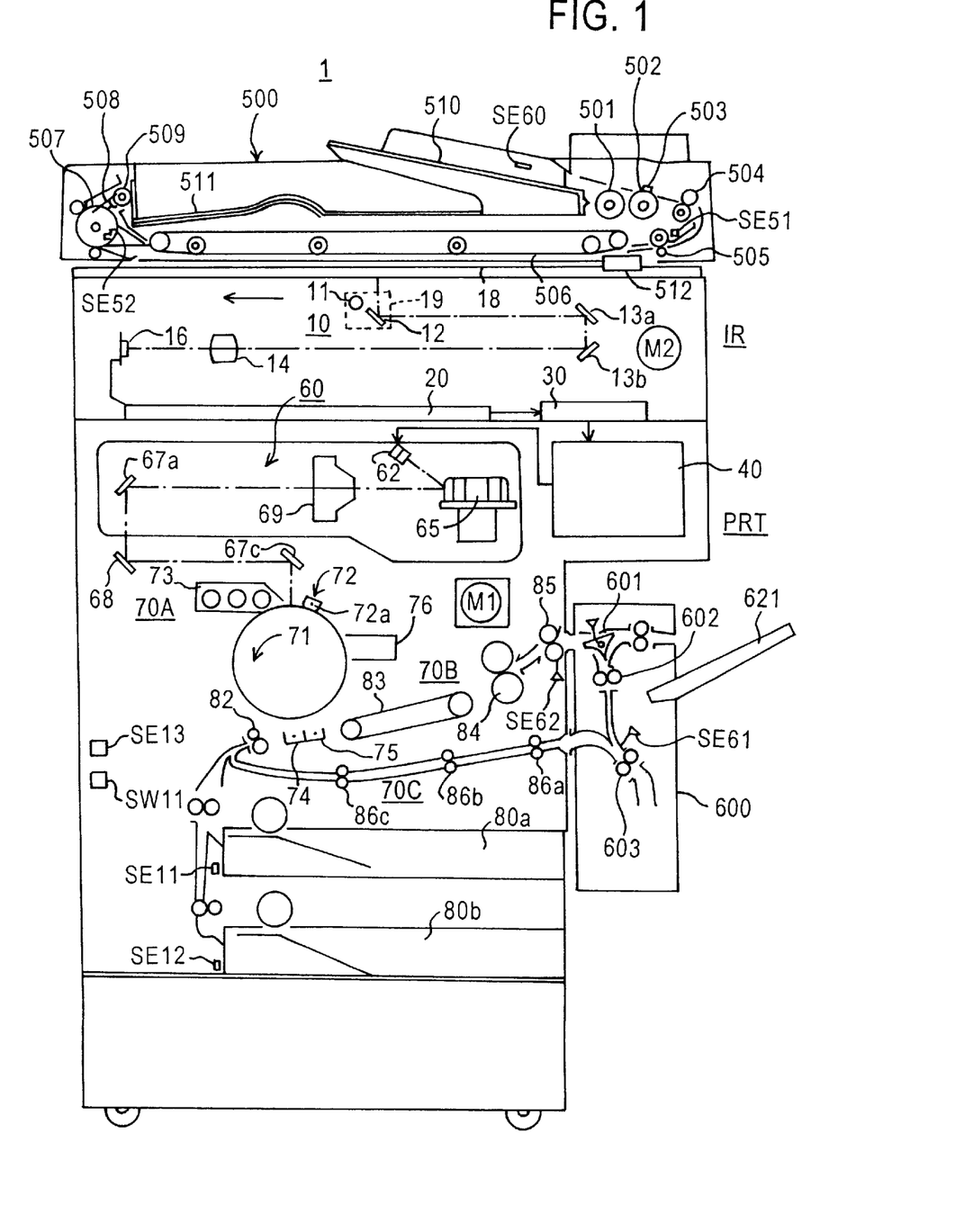
FIG. 1 is a front section view showing the overall construction of the copying apparatus of the present invention.

FIG. 1 is a front section view showing the overall construction of copying apparatus 1 of the present invention.

Copying apparatus 1 is a digital copying apparatus comprising an image reader IR and page printer PRT.

The body of image reader IR comprises a scanning unit 10 to read a document placed on a document platen 18 at pixel resolution, image signal processing unit 20 which executes quantization of photoelectric conversion signals output by said scanning unit 10 and executes signal processing in accordance with the various image forming modes, and memory unit 30 to store image data corresponding to said document. An automatic duplex document feeder (ADFR) 500 is provided at the top of the aforesaid body and is assembled so as to be openable by pivoting on the interior edge thereof to function as a document cover.

Scanning unit 10 is line scanning type image reading device comprising a scanner 19 having a document illumination lamp 11 and mirror 12, stationary mirrors 13a and 13b, condensing lens 14, an image sensor 16 comprising a charge-coupled device (CCD) array, and a scanning motor M2 to drive the scanner 19. Image signal processing unit 20 and memory unit 30 are described later.

ADFR 500 feeds documents stacked on a document stacker 510 onto document platen 18 via take-up roller 501, guide roller 502, guide pad 503, intermediate roller 504, registration roller 505, and transport belt 506, and after scanning ejects said document onto document discharge tray 511 via discharge roller 509. ADFR 500 is provided with a document sensor SE50 to detect the presence of a document, document size sensor SE51, and discharge sensor SE52.

When a plurality of documents are copied, for example, an operator stacks documents face upward. Each document stacked on document stacker 510 is pulled sheet by sheet from the bottommost sheet of the stack, and accurately sets said document face downward at the reading position on document platen 18. In the case of the simplex document mode, after scanning completes, the document is transported to the leftward in the drawing, and ejected face upward. In the case of the duplex document mode, a document transported in a leftward direction, after scanning of the front side completes, is inverted front-to-back by inverting roller 507, and returned to the scanning position on document platen 18, and is subsequently transported again in a leftward direction, after scanning of the back side completes, so as to be ejected.

The page printer PRT comprises a print processing unit 40 to output exposure control signals, print head 60 having a semiconductor laser 62 as a light source, photosensitive drum 71, and arranged around the periphery of said photosensitive drum 71 are developing and transfer unit 70A, fixing and discharge unit 70B having a pair of fixing rollers 84 and discharge rollers 85, and recirculation type sheet transport unit 70C including a refeeding unit 600, wherein copy images are printed by an electrophotographic process based on image data transmitted from the image reader IR. At the bottom of page printer PRT are provided two paper cassettes 80a and 80b, sheet size sensors SE11 and SE12, and feed rollers.

A laser beam emitted from semiconductor laser 62 is deflected in the scanning direction by a polygonal mirror 65, passes through main lens 69 and is directed by various mirrors 67a, 68, and 67c to an exposure position on photosensitive drum 71. The surface of photosensitive drum 71 is uniformly charged by charger 72. An electrostatic latent image formed by an optical exposure is developed as a toner image via developing device 73, and this toner image is transferred onto a sheet via transfer charger 74 at the transfer position (copy position). This sheet is then separated from the photosensitive drum 71 via a separation charger 75, and transported to the pair of fixing rollers 84 via transport belt 83, then ejected to discharge tray 621.

Refeeding unit 600 is attached to the side surface of page printer PRT as a peripheral device for automating duplex copies, and has the functions of temporarily storing sheets discharged from the page printer body by discharge roller 85, and refeeding sheets to the page printer body via switchable transport.

In simplex copy mode, a sheet passes through refeeding unit 600 and is ejected to discharge tray 621. Conversely, in duplex copy mode, the left end of a switching member 601 is moved upward by a solenoid not shown in the drawing, such that a sheet ejected from discharge roller 85 arrives at positive inverting roller 603 via transport roller 602. Thus, the sheet is returned to the page printer body. The returned sheet sequentially passes through horizontal rollers 86a, 86b, 86c to timing roller 82, where it stops temporarily. When a plurality of sheets are continuously fed, the sheets are sequentially transported with a predetermined spacing therebetween so as to avoid mutual overlapping of the sheets being transported to refeeding unit 600.

Figure 2:
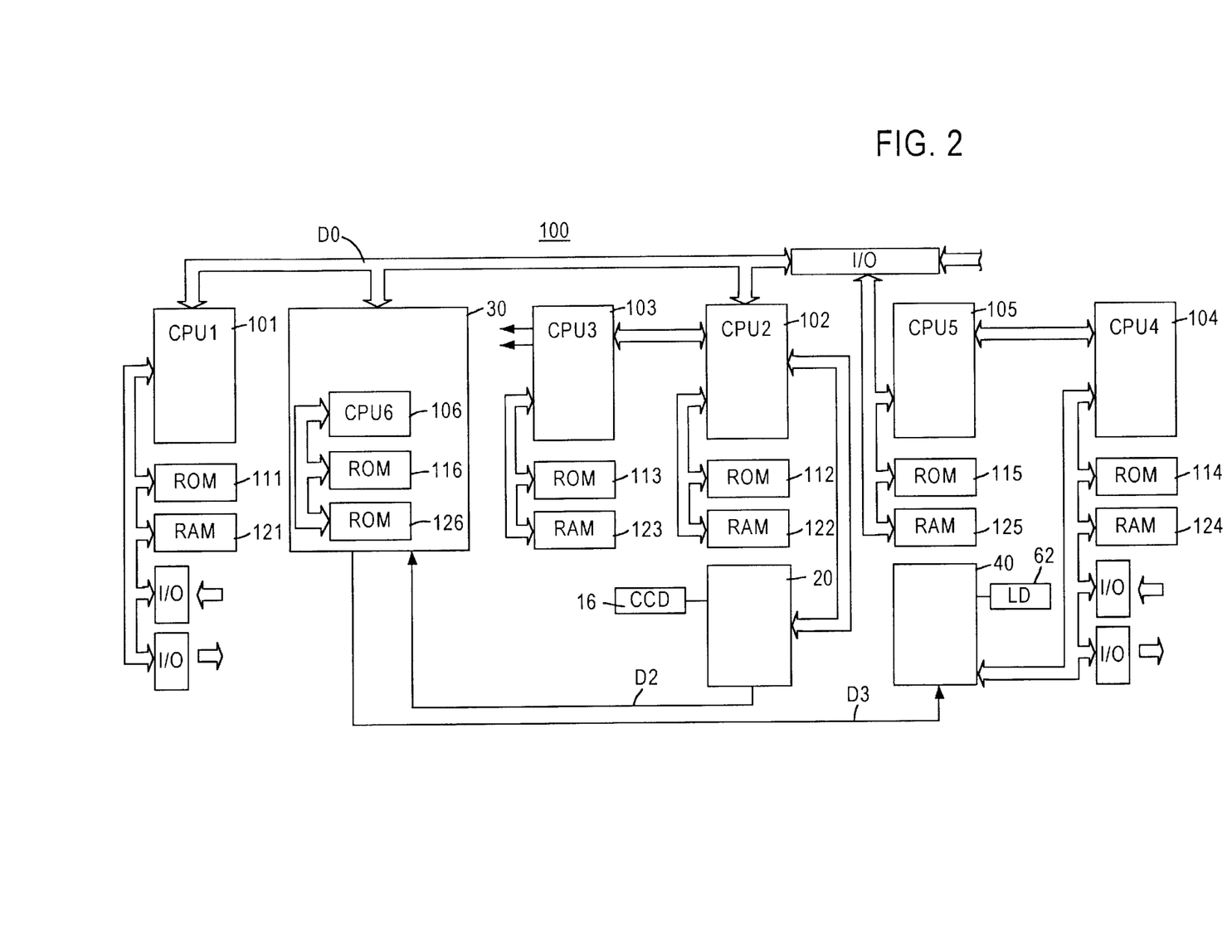
FIG. 2 is a block diagram showing the construction of the control unit of the copying apparatus.
Figure 3:
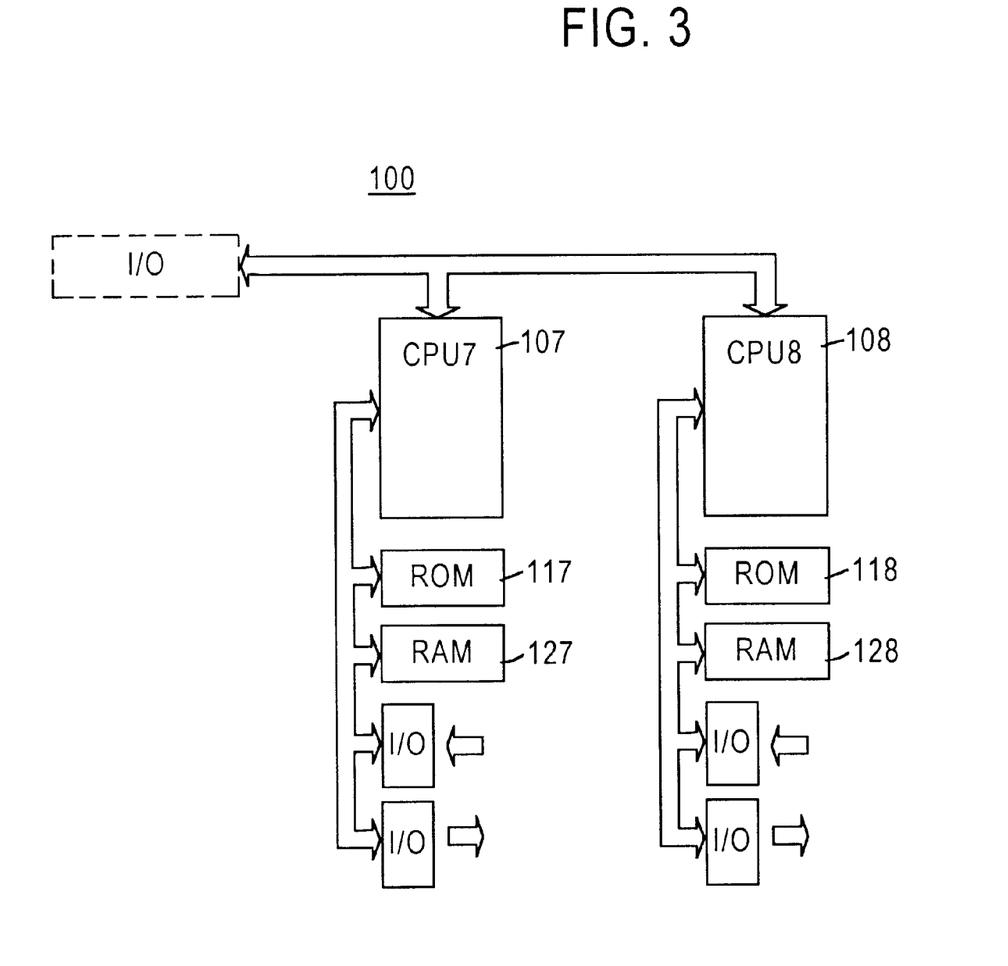
FIG. 3 is a block diagram showing the construction of the control unit of the copying apparatus.

FIGS. 2 and 3 are block diagrams showing the construction of control unit 100 of copying apparatus 1.

Control unit 100 has a core of eight individual central processing units (CPU) 101 through 108. These CPUs 101 through 108 are respectively provided with read only memories (ROM) 111 through 118 to store programs, and random access memories (RAM) 121 through 128 as work areas for program execution. CPU 106 is provided within memory unit 30.

CPU 101 controls displays and signal input from each operation key on operation panel OP. CPU 102 controls various parts of image processing unit 20, and CPU 103 executes drive control of scanning unit 10. CPU 104 controls the overall page printer PRT including the print processing unit 40.

CPU 105 executes processes to adjust the general timing of the control unit 100, and set the operation mode. Thus, CPU 105 executes serial communication with the other CPUs, and sends and receives commands and reports required for the controls.

CPU 106 controls the storing and readout of image data. CPU 107 controls document transport by ADFR 500. CPU 108 controls the refeeding unit 600.

Figure 4:
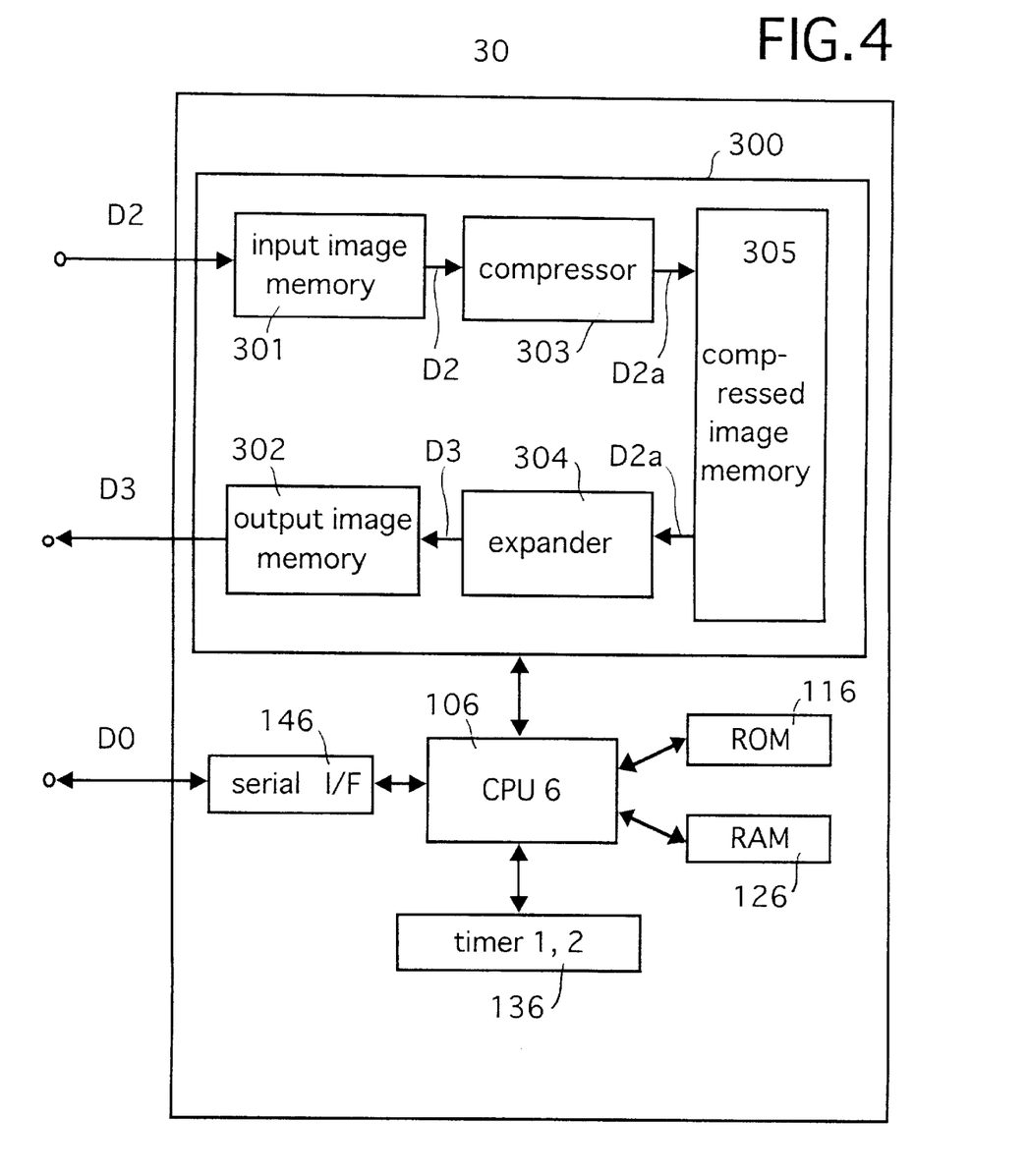
FIG. 4 is a block diagram showing the construction of the memory unit.

FIG. 4 is a block diagram showing the construction of memory unit 30.

Memory unit 30 is controlled by CPU 106 in accordance with the sequence of programs stored in ROM 116. Parameters and the like required for program execution are stored in RAM 126.

A serial interface I/F 146 is connected to CPU 106, to allow reception of commands and status reports by other control programs of CPU 101 and CPU 102 via serial interface I/F 146. A timer 136 is provided with two channels of timer 1 and timer 2, which are respectively used to measure time by operating at constant periods.

The image data of a document read by image reader IR is subjected to signal processing in accordance with the image forming mode via image signal processing unit 20, and outputs image data D2 for storage in input image memory 301. The image data D2 stored in input image memory 301 are subjected to compression processing by compressor 303 to obtain image data D2a, which are stored in compressed image memory 305.

The compressed data D2a stored in compressed image memory 305 are read out from compressed image memory 305 and subjected to an expansion processing by expander 304 to obtain image data D3 which are then stored in output image memory 302. The image data D3 stored in output image memory 302 are read out and transmitted to print processing unit 40 and subjected to print processing based on image data D3.

In the aforesaid series of processes, the start of the document reading process by image reader IR is accomplished by commands generated by CPU 102 and CPU 103 based on data DO transmitted from memory unit 30 via a bus shown in FIG. 2. Print processing is also accomplished by commands generated by CPU 104 and CPU 105 via data DO. Controls execute via the reception of these commands are identical to controls in conventional and well known printers and digital copiers.

In the copying apparatus 1 of the present embodiment, when a document is read by image reader IR, the first delay time TG1 required from the start of the reading of said document until the start of the compression process is determined based on the reading speed of image reader IR, compression speed of compressor 303, and document size SZ to prevent the compression processing of image data D2 of said document from completing before the reading of said document completes, such that the compression process is started after said first delay time TG1 has elapsed following the start of the document reading by image reader IR.

Furthermore, a second delay time TG2 required from the start of the compression processing of image data D2 of the document directly previous to the current document until the start of the reading of the current document is determined to prevent the reading of the current document from completing before the compression processing completes for the document directly previous to the current document being read, such that the reading of the current document starts after said second delay time TG2 has elapsed following the start of the compression processing of image data of the document directly previous to the current document being read.

Figure 5A:
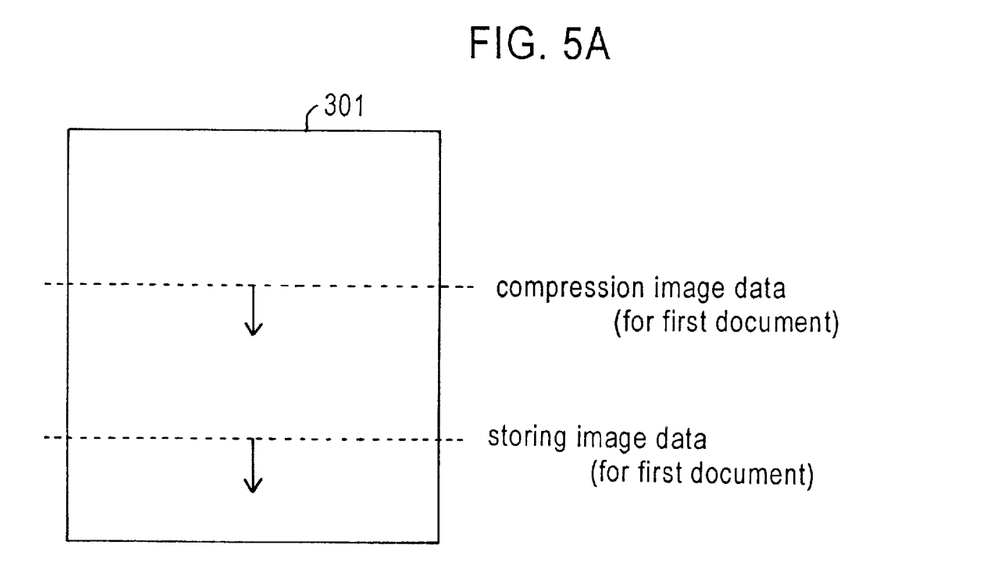
FIG. 5A and FIG. 5B illustrate an example of the positional relationship between the image data input to the input image memory and the image data subjected to compression processing.
Figure 5B:
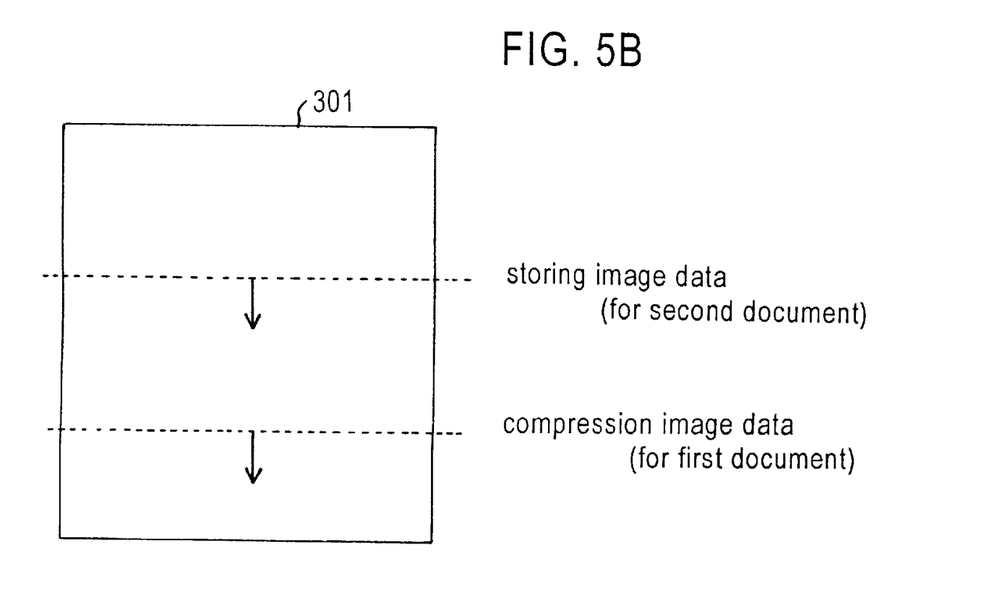

That is, in copying apparatus 1, image data D2 read by image reader IR are stored in input image memory 301, and the compression processing of said image data D2 is started while said image data D2 are being read by image reader IR, as shown in FIG. 5. In this case, the compression process starts after the first delay time TG1 has elapsed following the start of the reading process.

Furthermore, the reading of the next document is started during the compression process. The reading of a next document is started after the second delay time TG2 has elapsed following the start of the compression process so as to avoid having the reading process surpass the compression process.

The method of calculating the first delay time TG1 and second delay time TG2 is described below.

Referring now to FIG. 4, the speed of the compression process of compressor 303 (i.e., compression speed) or compression time can be calculated based on clock timing of the operation of compressor 303, and the number of clock units required to compress image data of a single sheet document. Although the number of clock units required for the compression process depends on the compression algorithm, it is possible to calculate the number of clock units required to compress an image at the highest compression rate (best image compression), and the number of clock units required to compress an image at the lowest compression rate (worst image compression) via algorithm, such that the maximum value and minimum value of compression speed can be thus determined to know the compression speed range.

Figure 6:
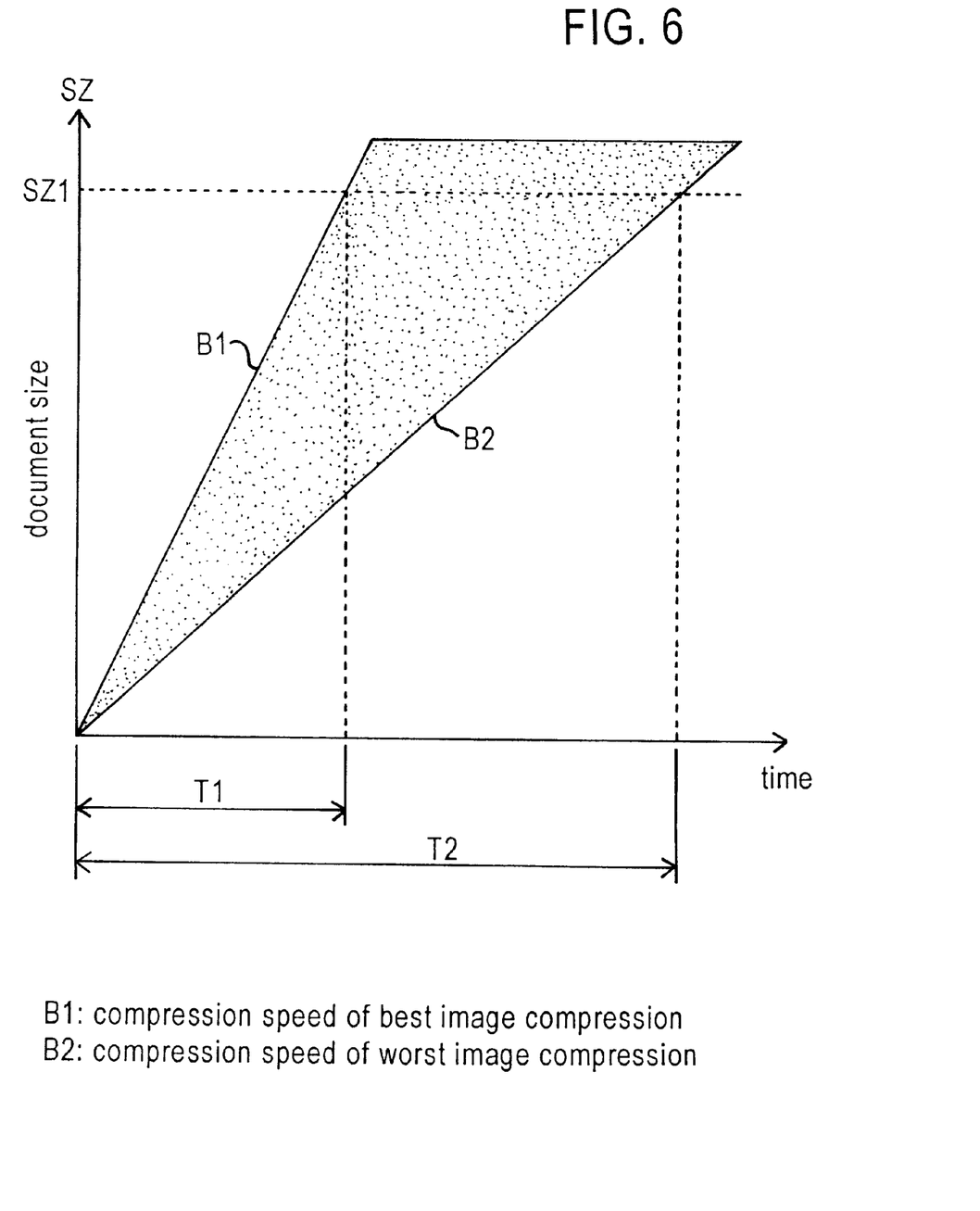
FIG. 6 is a graph showing the range of compression speed.

FIG. 6 is a graph showing the range of compression speeds.

In FIG. 6, when the compression speed of best image compression is designated B1, and the compression speed of worst image compression is designated B2, the values between the diagonal lines are the compression speed of compressor 303. Using this characteristic, the document size SZ can be detected beforehand by the document size sensor SE 51 shown in FIG. 1, and the minimum time T1 and maximum time T2 required for compressing the image of one page can be calculated from the detected document size SZ and the number of pixels of the image.

In FIG. 4, although the storage of image data D2 output from image sensor 16 of image reader IR in input image memory 301 has been described, conventionally, image data D2 stored in input image memory 301 is compressed, such that the completion of the storage of one sheet of document image data D2 in input image memory 301 must be awaited. As described in FIGS. 5 and 6, however, it is possible to subject image data D2 to compression processing while said image data D2 are being stored in input image memory 301, in which case the line being compressed may not surpass the line being read. Thus, the beginning of the compression process is can be faster than in conventional methods.

Figure 7:
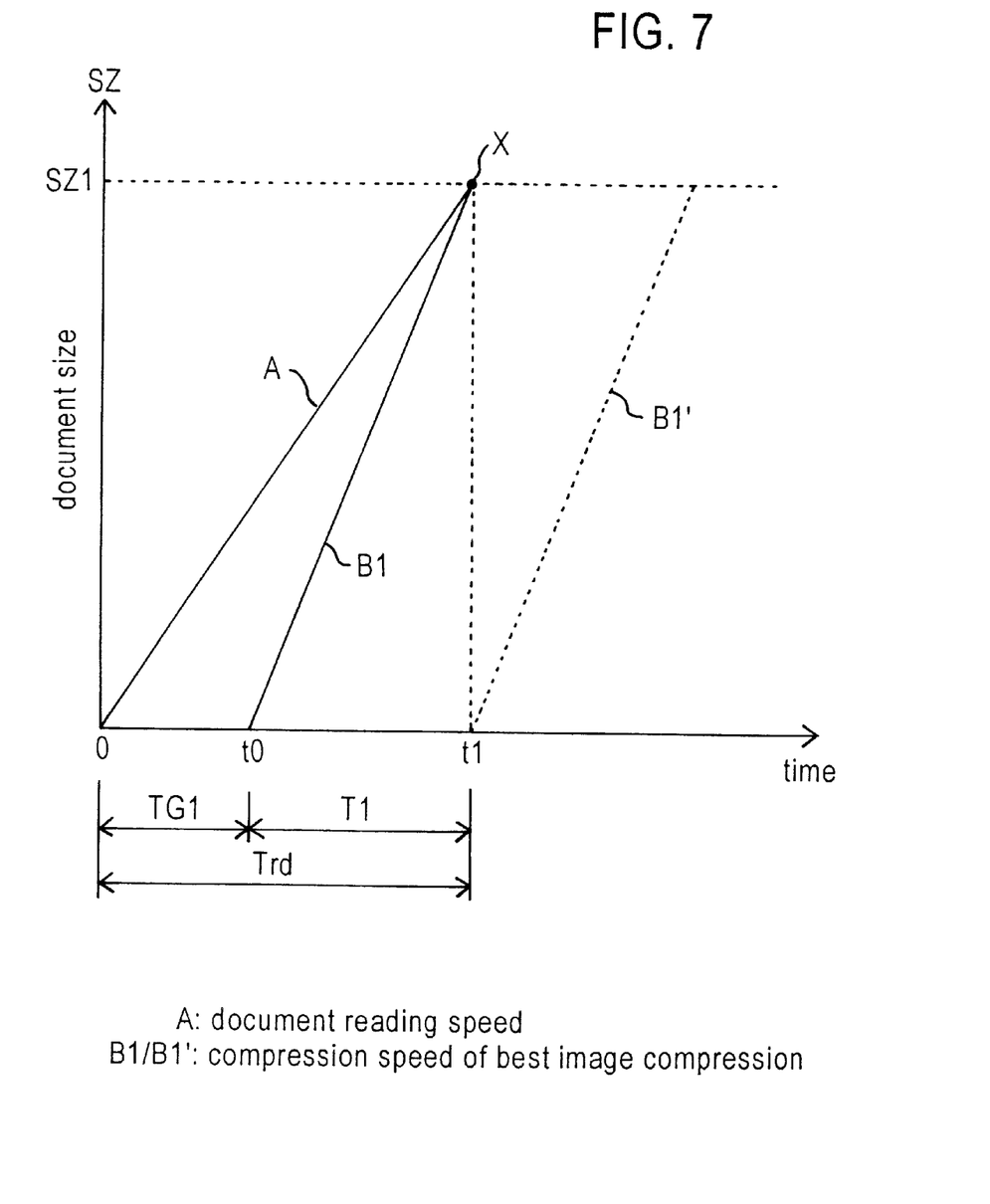
FIG. 7 illustrates the relationship between the document reading speed and the compression speed.

FIG. 7 illustrates the relationship between the document reading speed and the compression processing speed.

In FIG. 7, reference number B1 refers to the compression speed of the best compression rate shown in FIG. 6. The compression speed (B) will not surpass the reading speed (A) regardless of compression rate of the document image when the compression speed B1 is set so as to not surpass the reading speed (A) of the image reader IR. The reading speed (A) of image reader IR is dependent on the scanning speed of image reader IR and the operating speed of the bus transmitting image data D2, and thus can be calculated. That is, reading speed (A) may be considered the speed when executing a series of processes until image data D2 obtained from a read document image are stored in input image memory 301. The time Trd required to read a current document can be calculated from the aforesaid reading speed (A), and document size SZ detected by document size sensor SE51. Accordingly, avoidance of having the compression process overtake the reading performed by image reader IR can be assured by delaying the starting time of the compression process by a time TG1 after the start of the document reading. Time T1 is the minimum time TG1 required for the image compression process determined in FIG. 6. That is, the compression process can be started at time t0 delayed by time TG1 after the start of the document reading process by image reader IR. This time TG1 is the first delay time TG1, and can be calculated as TG1=Trd−T1.

The compression process can be started faster by the time T1 in the present embodiment compared to when the compression process is started after reading completes by the image reader IR because the compression process starts at time t1 in conventional methods.

Figure 8:
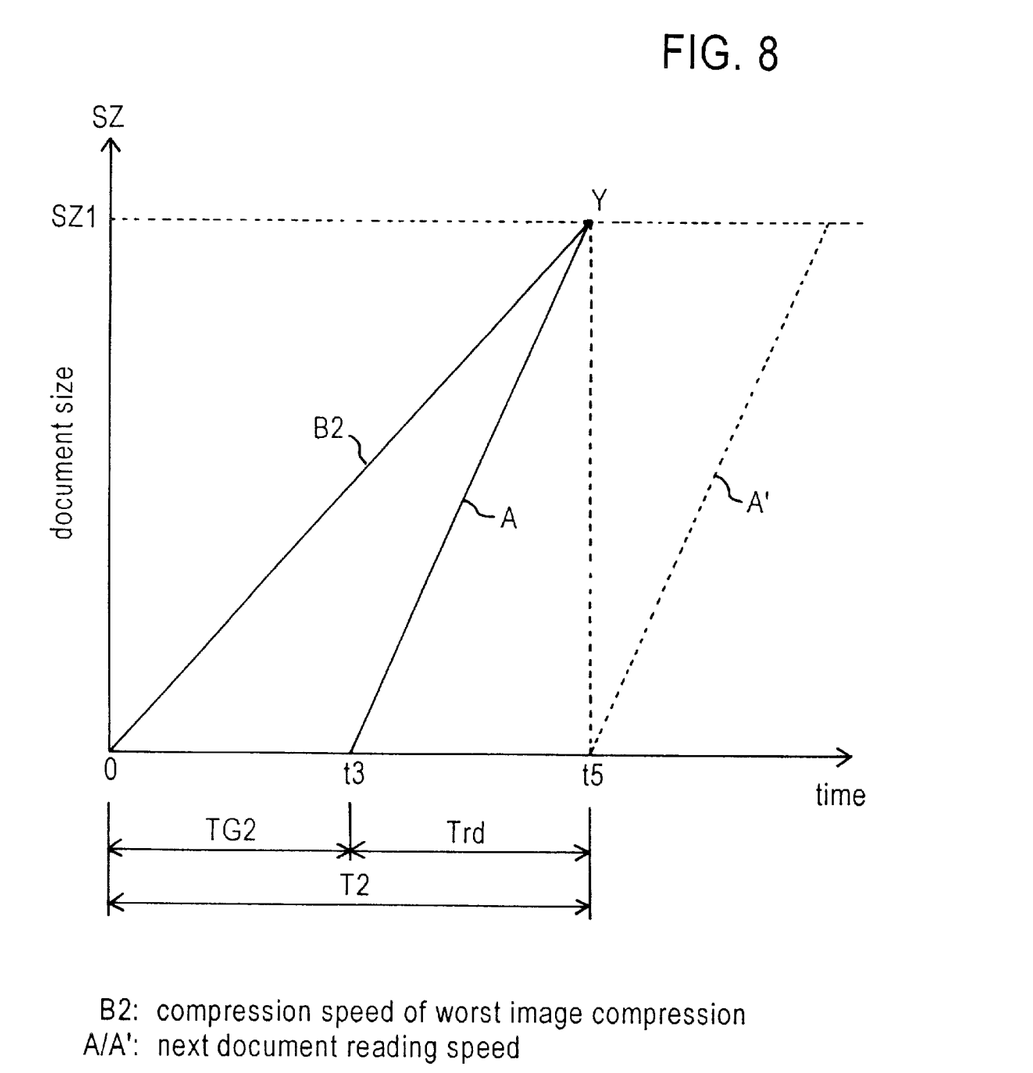
FIG. 8 illustrates the relationship between the compression speed and the next document reading speed.

FIG. 8 illustrates the relationship between the compression speed and the document reading speed.

In FIG. 8, reference number B2 refers to the compression speed of the worst compression rate shown in FIG. 6. The reading speed (A) will not surpass the compression speed (B) regardless of compression rate of the document image when the reading speed of the next document by image reader IR is set so as to not surpass the compression speed B2. Accordingly, avoidance of having the reading of the next document overtake the compression process can be assured by delaying the starting time of the reading process of the next document by a time TG2 after the start of the compression process. Time T2 is the maximum time TG2 required for the image compression process determined in FIG. 6. That is, the reading of the next document can be started at time t3 delayed by time TG2 after the start of the compression process. This time TG2 is the second delay time TG2, and can be calculated as TG2=T2−Trd.

The reading process can be started faster by the time Trd in the present embodiment compared to when the reading process of a next document is started after the compression process completes because the reading process of the next document starts at time t5.

Figure 9:
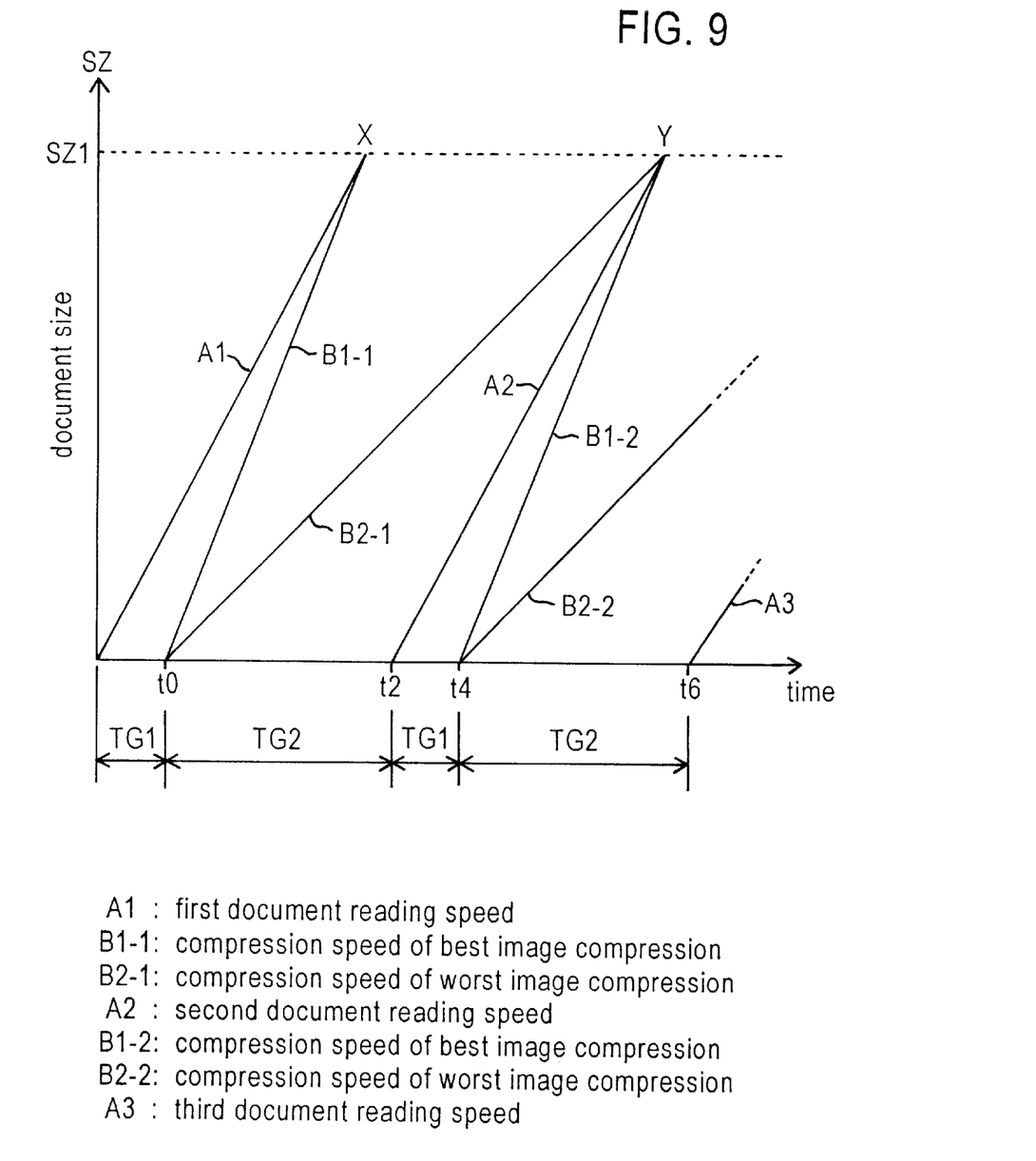
FIG. 9 illustrates the relationship of the timings between document reading speed and compression speed.

FIG. 9 illustrates the relationship between the timing of document reading and compression.

In FIG. 9, first reading process A1 starts at time 0, and the compression process for the image data D2 of this document (first compression process) is started at time t0 after a first delay time TG1 has elapsed. The reading of the next document A2 (second reading) starts at time t2 after the second delay time TG2 has elapsed following the start of the first compression process. The compression process (second compression process) of image data D2 of the next document starts at time t4 after the first delay time TG1 has elapsed following the start of the second reading process A2. Thus, the document reading and image data compression processes are executed so as to have mutually overlapping portions.

The first delay time TG1 and the second delay time TG2 may be set for each document, or a value may be used which is calculated based on the first document in a series of documents (jobs) of a plurality of pages. When the compression process completes before the reading of a next document starts for reasons such as a high compression rate or the like, the reading of the next document may start at the moment the compression process completes without waiting for the elapse of the second delay time TG2. The starting time of document reading must actually be faster because the time required by the system cannot be reduced even when the time until the start of the reading of a next document is less than the minimum time required to read a document by the system.

The compression processing may be started only after the first delay time TG1 has elapsed following the start of document reading, and starting the reading of a next document after the compression process completes. Furthermore, the reading of a next document may be started only after the second delay time TG2 has elapsed following the start of the compression process, and starting the compression process of said next document after said reading process completes. When the capacity of input image memory 301 is a plurality of pages, reading may be executed until the capacity of input image memory 301 is filled regardless of the advancing state of the compression process.

The operation of memory unit 30 is briefly described hereinafter with reference to the flow charts.

Figure 10:
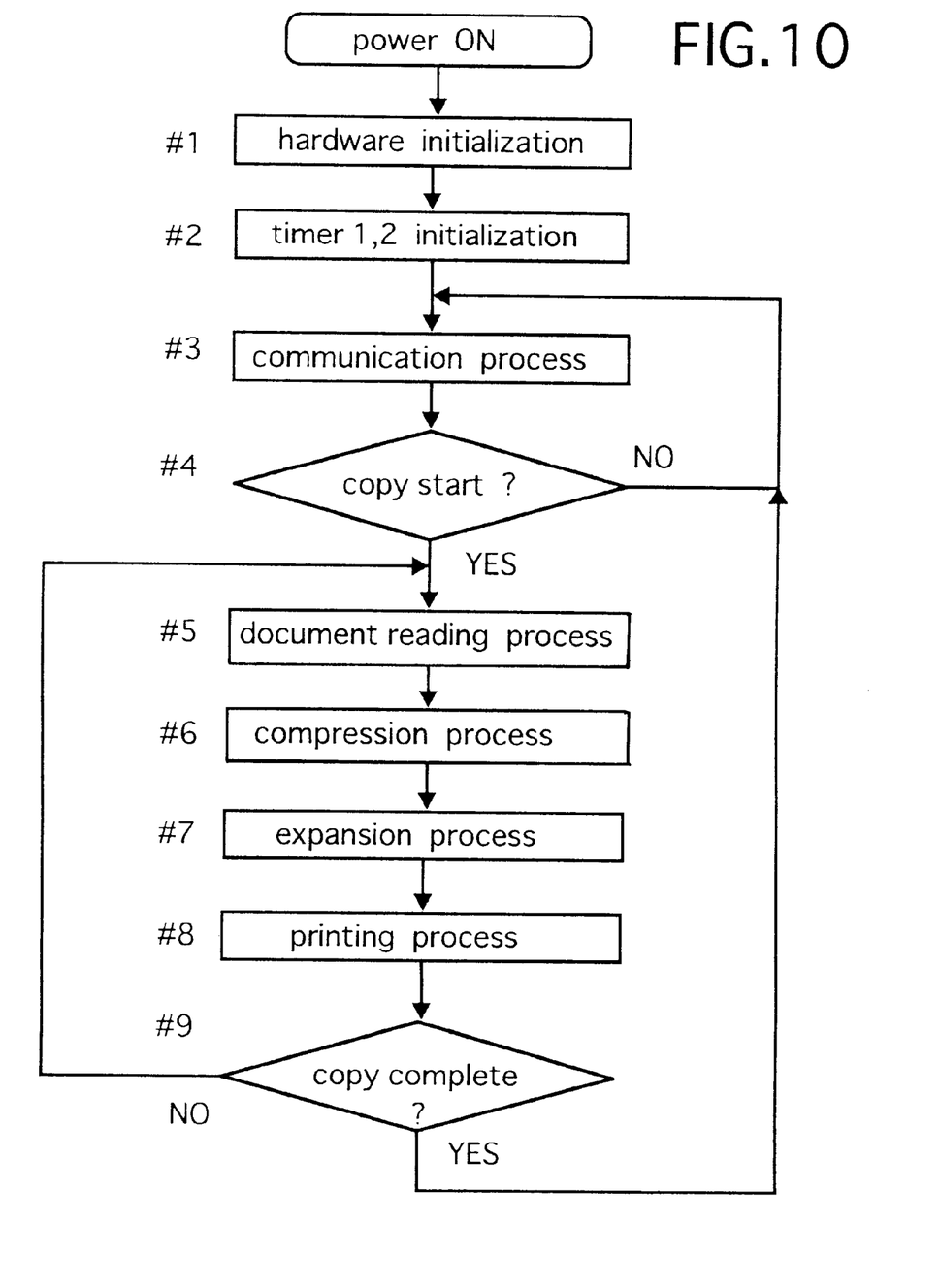
FIG. 10 is a flow chart showing the overall processing operation of the memory unit.
Figure 11:
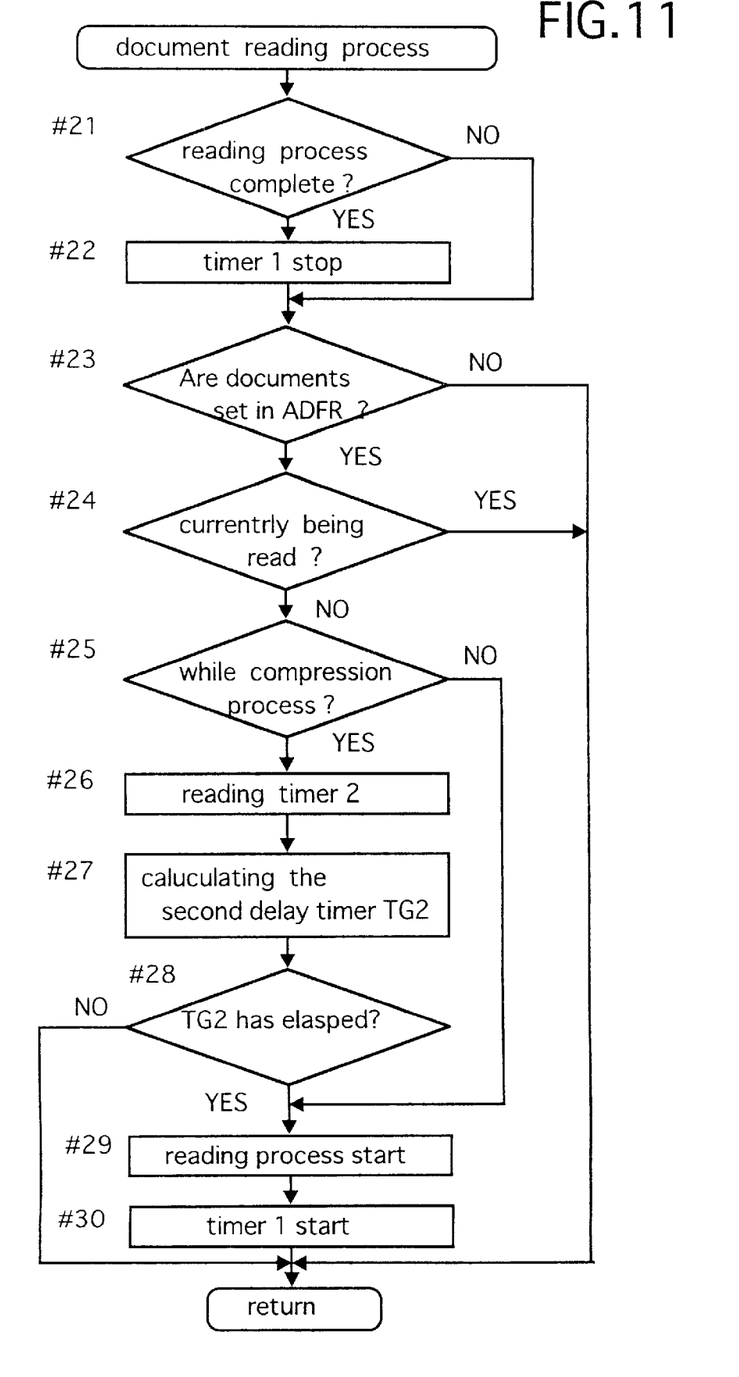
FIG. 11 is a flow chart of the document reading process.
Figure 12:
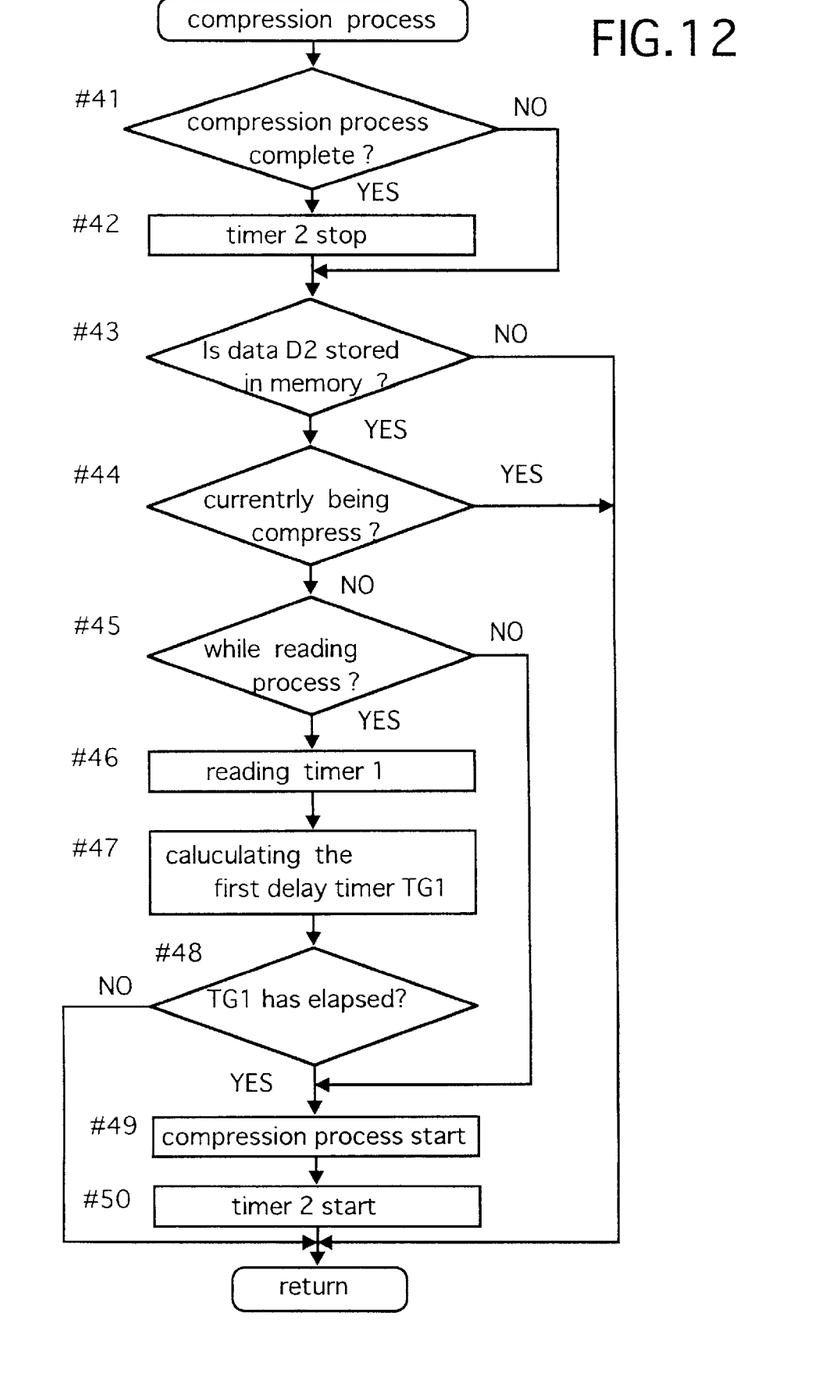
FIG. 12 is a flow chart of the compression process.

FIG. 10 is a flow chart showing the general operation of memory unit 30. FIG. 11 is a flow chart of the document reading process of step #5 of FIG. 10, and FIG. 12 is a flow chart of the compression process of step #6 of FIG. 10.

In FIG. 10, when the power unit is turned ON, hardware initialization and initialization of parameters required to execute programs are executed (step #1). Timers 1 and 2 (timer 136) are initialized (step #2). Communications processes are executed to communicate with other CPUs (step #3). When a copy start request is transmitted from CPU 101 (step #4: YES), the document reading process (step #5), compression process (step #6), expansion process (step #7), and printing process (step #8) are executed for copy controls. These processes continue until the copy job is completed (step #9: YES).

In FIG. 11, when documents to be read are stacked in ADFR 500 (step #23: YES), a check is made to confirm a document is not currently being read (step #24). When a document is not set in ADFR 500 and a document is currently being read, document reading cannot be accomplished, and the routine returns (steps #23, #24: NO).

When a compression process is currently ongoing (step #25: YES), the timer 2 started by the beginning of the compression process is read (step #26), and the time (second delay time TG2) required to assure image data D2 stored in input image memory 301 by the previously described method is calculated (Step #27) to determine whether or not a time (second delay time TG2) has elapsed to prevent document reading to overtake the compression process.

When the assurance time is satisfied (i.e., when the second delay time TG2 has elapsed) (step #28: YES), the reading of the next document starts (step #29), and timer 1 is started to check the passage of time after reading starts (step #30).

When the compression process has completed (step #25: NO), the reading of the document starts immediately (step #29).

When reading is completed (step #21: YES), the timer 1 started in step #30 is stopped (step #22).

In FIG. 12, when image data D2 to be compressed is stored in input image memory 301 (step #43: YES), a check is made to confirm that a compression process is not currently ongoing (step #44). When a compression process is currently being executed, the routine returns because two compression processes cannot be executed simultaneously (step #44: NO).

When a document reading process is currently ongoing (step #45: YES), the timer 2 started by the beginning of the reading process is read (step #46), and the time (first delay time TG1) required to assure image data D2 stored in input image memory 301 by the previously described method is calculated (step #47) to determine whether or not a time (first delay time TG1) has elapsed to prevent the compression process to overtake the document reading process.

When the assurance time is satisfied (i.e., when the first delay time TG1 has elapsed) (step #48: YES), the compression process starts (step #49), and timer 2 is started to check the passage of time after the compression process starts (step #50).

When the reading process has completed (step #45: NO), the compression process starts immediately (step #49).

When the compression process is completed (step #41: YES), the timer 2 started in step #50 is stopped (step #42).

Consider in the above embodiments, methods of improving reading speed by dividing a document into a plurality of image areas, and subjecting image data D2 of each image area to compression processing upon being input. In this case also, the compression process may be started before the input process is completed by using the method described above because the compression process cannot be overtaken until the completion of the input process (reading process) for the image data D2 of the aforesaid image areas. Furthermore, in this circumstance, the compression process of second and subsequent image areas may be started immediately after a time corresponding to the first delay time TG1 has elapsed as shown in FIG. 7.

The present invention may be variously modified as to the general construction of copying apparatus 1 and memory unit 30 as well as the construction of the various components therein, as well as the contents and sequences of the processes and timing of operations insofar as such modifications do not depart from the scope of the invention. The present invention may be applied to facsimile systems for compressing and transmitting information obtained by scanning a document, as well as to other data processing apparatuses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image processing apparatus comprising:
   an image reader which reads image data of an image;
   an image memory which stores the image data read by said image reader;
   a compressor which receives the image data from said image memory, and performs a compression process whereby it compresses the image data; and
   a controller which controls a start timing of the compression process such that said compressor begins compressing the image data while said image reader is reading the image data, but does not complete compression of the image data stored in said image memory before said image reader completes reading the image data and a last of the image data is stored into said image memory.

2. The image processing apparatus according to claim 1, wherein said controller calculates a time period for delaying the compression process to prevent completing the compression of the image data stored in the image memory before the image reader completes reading the image and storing the image data in said image memory.

3. The image processing apparatus according to claim 2, wherein said controller starts said compression process after said time period has elapsed from a time that the image reader starts reading the image, whereby storing the image data into said image memory and compressing the image data are simultaneously performed.

4. The image processing apparatus according to claim 2, wherein said time period is determined based on a speed of storing the image data into said image memory, a speed of the compression process, and a size of said image.

5. The image processing apparatus according to claim 4, wherein said speed of storing image data into said image memory is predetermined.

6. The image processing apparatus according to claim 4, wherein said speed of the compression process corresponds to a minimum compression rate.

7. The image processing apparatus according to claim 1, wherein said controller controls the start timing of the compression process based on a compression rate of the compressor.

8. An image processing apparatus comprising:
   an image reader which sequentially reads first image data of a first document and a second image data of a second document;
   an image memory which stores the first and second image data read by said image reader;
   a compressor which sequentially receives the first and second image data from said image memory, and performs a compression process whereby it compresses the first and second image data; and
   a controller which controls a start timing of an operation of said image reader such that said image memory begins storing the second image data before said compressor completes compression of the first image data, but does not complete storing the second image data before said compressor completes compression of the first image data.

9. The image processing apparatus according to claim 8, wherein said controller calculates a time period for delaying a process of storing the second image data into said image memory to prevent completing storage of the second image data in the image memory before the compressor completes compression of the first image data.

10. The image processing apparatus according to claim 9, wherein said controller controls said image reader to start reading said second image data when said time period has elapsed from a time that the compressor starts compressing the first image data, whereby storing the second image data into said image memory and compressing the first image data are simultaneously performed.

11. The image processing apparatus according to claim 9, wherein said time period is determined based on a speed of storing the first and second image data into said image memory, a speed of the compression process, and sizes of said first and second documents.

12. The image processing apparatus according to claim 11, wherein said speed of storing the first and second image data into said image memory is predetermined.

13. The image processing apparatus according to claim 11, wherein said speed of the compression process corresponds to a maximum compression rate.

14. The image processing apparatus according to claim 8, wherein said controller controls the start timing of the operation of the image reader based on a compression rate of the compressor.

15. A method for processing an image comprising the steps of:
   (a) reading image data of the image by an image reader and storing the image data in an image memory;
   (b) reading the image data from the image memory and compressing the image data read from the image memory; and
   (c) controlling a start timing of compressing the image data so that compressing the image data begins while the image reader is reading the image data, but is not completed before the image reader completes reading the image data and a last of the image data is stored into the image memory, to prevent the process of compressing the image data from overtaking the process of storing image data.

16. The method according to claim 15, wherein the control in said step (c) is based on a compression rate in said step (b).

17. A method for processing first and second images comprising the steps of:
   (a) sequentially reading first image data of the first image and second image data of the second image and storing the first and second image data in an image memory;
   (b) sequentially reading the first and second image data from the image memory and compressing the first and second image data read from the image memory; and
   (c) controlling a start timing of steps (a) and (b) so that the image memory begins storing the second image data before completion of compressing the first image data, but storing the second image data is not completed before completion of compressing the first image data, to prevent the operation of storing the second image data from overtaking the compression of the first image data.

18. The method according to claim 17, wherein the control in said step (c) is based on a compression rate in said step (b).

19. An image processing apparatus comprising:
   an image memory that stores image data sent from an image inputting section;
   a compressor that receives the image data from the image memory, and performs a compression process on the image data, wherein a compression rate of the compressor varies depending on the image data; and
   a controller that controls a start timing of the compression process by the compressor such that the compression process on the image data begins while the image memory is storing the image data from the image inputting section, but is not completed before a last of the image data is sent from the image inputting section to the image memory for storing, irrespective of the compression rate.

20. The image processing apparatus according to claim 19, wherein the controller controls the start timing of the compression process based on the compression rate of the compressor.

* * * * *